United States Patent [19]

Su et al.

[11] Patent Number: 4,857,606

[45] Date of Patent: Aug. 15, 1989

[54] WETTABLE, FLEXIBLE, OXYGEN PERMEABLE, SUBSTANTIALLY NON-SWELLABLE CONTACT LENS CONTAINING POLYOXYALKYLENE BACKBONE UNITS, AND USE THEREOF

[75] Inventors: Kai C. Su, Alpharetta; Frank F. Molock, Lawrenceville, both of Ga.

[73] Assignee: Ciga-Geigy Corporation, Ardsley, N.Y.

[21] Appl. No.: 222,581

[22] Filed: Jul. 21, 1988

Related U.S. Application Data

[62] Division of Ser. No. 58,496, Jun. 5, 1987.

[51] Int. Cl.$^4$ ............................................. C08F 283/04
[52] U.S. Cl. .................................... 525/455; 523/106; 528/75

[58] Field of Search ........................ 523/106; 525/455; 528/75

[56] References Cited

U.S. PATENT DOCUMENTS 4,780,488 10/1988 Su et al. ................................ 528/75

Primary Examiner—Morton Foelak
Attorney, Agent, or Firm—Luther A. R. Hall; Irving M. Fishman

[57] ABSTRACT

Contact lenses which are optically clear, wettable, flexible, of high oxygen permeability and substantially non-swellable in the aqueous ocular environment of use, of a polymer containing polyoxyalkylene backbone units are disclosed, as well as the preparation thereof and methods of treating vision defects therewith.

2 Claims, No Drawings

WETTABLE, FLEXIBLE, OXYGEN PERMEABLE, SUBSTANTIALLY NON-SWELLABLE CONTACT LENS CONTAINING POLYOXYALKYLENE BACKBONE UNITS, AND USE THEREOF

This is a divisional of application Ser. No. 058,496 filed on June 5, 1987.

BACKGROUND OF THE INVENTION

1. Field of the Invention

This invention relates to opthalmic devices, such as contact lenses and intraocular implants, and particularly contact lenses of a polymer containing a backbone containing polyoxyalkylene units possessing a unique blend of properties including (a) high oxygen permeability, (b) good wettability, (c) flexibility, (d) optical clarity, and (e) a substantial lack of aqueous swellability in the ocular environment of use.

2. Background of the Invention

The use of optical contact lenses for the correction of vision defects or for cosmetic purposes is well known. However existing contact lenses have been found to be unacceptable to many potential contact lens patients for a variety of reasons. For example, early contact lenses were made from polymethyl methacrylate (PMMA). While PMMA lenses have high optical clarity and good durability, they are rigid lenses possessing low oxygen permeability. Consequently, PMMA lenses may result in eye irritation and corneal oxygen deprivation leading to wearer intolerance and limiting the usefulness of such lenses.

In an attempt to avoid these problems, so-called "soft" lenses, capable of swelling in an aqueous environment, were developed. These "soft" or hydrogel lenses, characteristically made from poly (2-hydroxyethyl methacrylate), poly (vinyl alcohol) or poly (vinylpyrrolidone) generally result in less irritation and intolerance than PMMA lenses for most patients. When substantial amounts of water are absorbed into the hydrogel, the oxygen permeability is increased over that of PMMA lenses, and the flexibility of such hydrogel lenses is high, thereby increasing patient comfort. However, the oxygen permeability of such hydrogel lenses is generally still rather low, and the durability is poor. Moreover, due to the high water content of such lenses, they generally have a tendency to collect and trap proteinaceous and other tear fluid materials, resulting in lens clouding over a period of time.

In another attempt to solve problems associated with early lenses, silicone, or siloxane, rubber lenses were developed. They are advantageous in that they possess high oxygen permeability and an aesthetically appealing texture when worn. However, due evidently to the generally low thermal conductivity of silicone rubber, burning sensations in wearers of silicone rubber lenses have been reported. Also, as silicone lenses tend to be lipophilic, such lenses may tighten onto the cornea, trapping debris between the lens and cornea, thereby resulting in corneal abrasions. Also, due to the characteristic lipophilic nature of such lenses, the silicone rubber is mucophilic and non-wettable, attracting ocular debris such as proteins, lipids, mucoids and the like.

It is an object of the present invention to overcome these and other disadvantages of the art by providing substantially siloxane free, wettable, oxygen permeable, but substantially non-swellable, opthalmic devices, such as contact lenses and corneal implants, of a polymer containing polyoxyalkylene backbone units.

A further object of the invention is to provide a method of correcting visual defects in the form of refractive errors by fitting to the patient's eye in need of the same, a corrective contact lens of such polymer.

These and other objects of the invention are apparent from the following detailed description of the invention.

DETAILED DESCRIPTION

One embodiment of the present invention relates to an optically clear, hydrolytically stable, biologically inert, wettable and flexible, substantially siloxane free, non-swellable in aqueous ocular tear fluid, oxygen permeable ophthalmic device, such as a contact lens, fabricated from a polymer containing segments of the formula

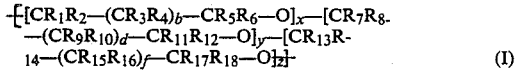

$$\{[CR_1R_2\text{—}(CR_3R_4)_b\text{—}CR_5R_6\text{—}O]_x\text{—}[CR_7R_8\text{—}(CR_9R_{10})_d\text{—}CR_{11}R_{12}\text{—}O]_y\text{—}[CR_{13}R_{14}\text{—}(CR_{15}R_{16})_f\text{—}CR_{17}R_{18}\text{—}O]_z\}\text{—} \quad (I)$$

wherein each b, d and f are independently 0–4; q is a number from 1 to 1000; each x, y and z are independently 0 to a number such that $(x+y+z)$ multiplied by $q=4$ to 1000; each of $R_1$, $R_2$, $R_5$–$R_8$, $R_{11}$–$R_{14}$, $R_{17}$ and $R_{18}$ are independently selected from the group H, aliphatic, aromatic or heterocyclic containing radical such as: unsubstituted $C_1$–$C_{16}$ alkyl; substituted $C_1$–$C_{16}$ alkyl; unsubstituted $C_2$–$C_{16}$ alkenyl; and substituted $C_2$–$C_{16}$ alkenyl; wherein the alkyl and alkenyl substituents are independently selected from $C_1$–$C_{16}$ alkoxycarbonyl, $C_2$–$C_{16}$ alkenyloxycarbonyl, fluoro, aryl of up to 10 carbon atoms, $C_1$–$C_8$ alkoxy, $C_2$–$C_6$ alkanoyloxy, aryloxy of up to 10 carbon atoms, $C_3$–$C_6$ alkenoyloxy, aroyloxy of up to 11 carbon atoms, $C_3$–$C_8$ cycloalkyl, $C_3$–$C_8$ cycloalkyloxy, $C_3$–$C_8$ cycloalkyl-carbonyloxy, $C_3$–$C_8$ cycloalkoxy-carbonyl, oxyacycloalkyl of up to 7 carbon atoms, oxacycloalkoxy of up to 7 carbon atoms, oxacycloalkoxy (up to 7 carbon atoms)-carbonyl, oxacycloalkyl (up to 7 carbon atoms)-carbonyloxy, and aryl (of up to 10 carbon atoms)-oxycarbonyl, each of said alkyl and alkenyl substituents being, in turn, optionally substituted by $C_1$–$C_6$ alkyl, fluoro or a $C_1$–$C_6$ alkoxy provided said last mentioned alkoxy is not bound to a carbon atom already bound to another oxygen atom; $R_1$, $R_2$, $R_5$–$R_8$, $R_{11}$–$R_{14}$, $R_{17}$ and $R_{18}$ being further independently selected from aryl of up to 10 carbon atoms, $C_3$–$C_8$ cycloalkyl, and oxacycloalkyl of up to 7 carbon atoms, each of which may be unsubstituted or further substituted with a substituent selected from the group of substituents for said alkyl set forth above; $R_3$, $R_4$, $R_9$, $R_{10}$, $R_{15}$ and $R_{16}$ are selected from the same group set forth above for $R_1$; and $R_3$, $R_4$, $R_9$, $R_{10}$, $R_{15}$ and $R_{16}$ are further independently selected from $C_1$–$C_{16}$ alkoxycarbonyl, $C_2$–$C_{16}$ alkanoyloxy, $C_2$–$C_{16}$ alkenoxycarbonyl, and $C_3$–$C_{16}$ alkenoyloxy, each of which may be further substituted by fluoro, aryl of up to 10 carbon atoms, or $C_1$–$C_{16}$ alkoxy, and $R_3$, $R_4$, $R_9$, $R_{10}$, $R_{15}$ and $R_{16}$ are still further independently selected from aryloxy of up to 10 carbon atoms, cycloalkoxy of up to 8 carbon atoms, cycloalkyl (of up to 8 carbon atoms)-carbonyloxy, cycloalkoxy (of up to 8 carbon atoms)-carbonyl, aroyloxy of up to 11 carbon atoms, oxacycloalkoxy of up to 7 carbon atoms, oxacycloalkenoxy of up to 7 carbon atoms, oxacycloalkoxy (of up to 7 carbon atoms)-carbonyl, oxacycloalkyl (of up to 7 carbon atoms)-carbonyloxy, oxacycloalkenyloxy (of up to 7 carbon atoms)-carbonyl, and aryloxy (of up to 10 carbon atoms)-carbonyl, each of which may be further substituted by fluoro, $C_1$-$C_6$ alkyl or $C_1$-$C_6$ alkoxy, provided that any substituent having an oxygen atom or carbonyl group thereof as its link to the rest of the molecule may not be a substituent on the same carbon atom which is bonded to another oxygen atom. In addition, 2 adjacent R groups, together with the atoms to which they are attached, may form a 5–8 membered cycloalkyl, oxacycloalkyl or bicycloalkyl ring. When each of b, d, and f is 0, at least one of $R_1$, $R_2$, $R_5$-$R_8$, $R_{11}$-$R_{14}$, $R_{17}$ and $R_{18}$ in at least a portion of the segments having formula I is other than hydrogen and such group $R_1$, $R_2$, $R_5$-$R_8$, $R_{11}$-$R_{14}$, $R_{17}$ and $R_{18}$ individually or in the aggregate is sufficiently hydrophobic such that the resulting polymer is substantially non-swellable in water, and wherein the polymer is sufficiently hydrophilic that it exhibits a receding contact angle with distilled water at 20° C. of less than 60°, preferably less than 40°, more preferably less than 25°, even more preferably less than 15°, most preferably less than 10°.

In the foregoing, all alkyl groups whether mentioned alone or as part of another group are preferably $C_1$-$C_4$ alkyl, such as methyl, ethyl, propyl and butyl, especially t-butyl, with the exception that adjacent groups on aryl rings cannot each be t-butyl. These alkyl groups may be straight chain or branched chain. When the alkyl is a substituent on a phenyl ring, it is preferably attached at the para position. Preferable alkenyl groups, whether alone or as part of another group, are preferably $C_2$-$C_4$ alkenyl, such as ethenyl, propenyl, or butenyl. Preferred aryl groups (whether alone or as part of another group) are phenyl or naphthyl, more preferably phenyl. Preferably, the aryl groups are still further substituted by $C_1$-$C_4$ alkyl, more preferably t-butyl, most preferably in the para position.

Preferably b, d and f are independently 0–3, most preferably 1–2. A further preferred embodiment is that the group identified by formula I be at least 25% halogen free, more preferably 30%, still more preferably 40%, even more preferably substantially halogen free and most preferably, totally halogen free. Wherever cyclo groups are indicated, whether carbocyclic or heterocyclic they preferably have 5–6 ring members and the heterocyclics preferably have only carbon and an oxygen atom as a ring member.

In formula I, when b is greater than one, each of the multiple $R_3$ and $R_4$ groups may be the same or different; however preferably all of the $R_3$ groups are the same and all of the $R_4$ groups are the same. The same is true with respect to d, $R_9$, and $R_{10}$; and f, $R_{15}$, and $R_{16}$.

Preferably, each of b, d and f are independently an integer of 0 to 2, and most preferably zero or one.

In one aspect of the invention, each of $R_1$-$R_5$, $R_7$-$R_{11}$, and $R_{13}$-$R_{17}$ are hydrogen, and, if b, d, and f are each 0, then at least one of $R_6$, $R_{12}$ and $R_{18}$ in at least a portion of the segments of formula I is other than hydrogen. Preferably, at least one of $R_6$, $R_{12}$ and $R_{18}$ in most ments is other than hydrogen. More preferably, the majority (and most preferably all) of the segments of Formula I have at least one of $R_6$, $R_{12}$ and $R_{18}$ other than hydrogen. Preferred substituents for $R_6$, $R_{12}$ and $R_{18}$ are alkyl of up to 16 carbon atoms; alkyl of up to 16 carbon atoms substituted by alkoxy of up to 8 carbon atoms, or fluoro; phenyl which is unsubstituted or substituted by fluoro, alkoxy of up to 6 carbon atoms or alkyl of up to 6 carbon atoms; benzyl wherein the phenyl ring thereof is unsubstituted or substituted by fluoro, alkoxy of up to 6 carbon atoms or alkyl of up to 6 carbon atoms; cyclohexyl; or oxacycloalkyl of 4 to 5 ring carbon atoms.

A highly advantageous subembodiment relates to wettable, non-swellable ophthalmic devices, preferably contact lenses, fabricated from a polymer containing segments of the formula

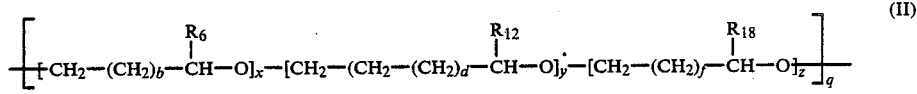

(II)

wherein b, d, f, q, x, y, z, $R_6$, $R_{12}$ and $R_{18}$ are as defined above with at least one of $R_6$, $R_{12}$ and $R_{18}$ (when present) being other than hydrogen. There are two very highly advantageous embodiments having formula II which are represented by either formula III

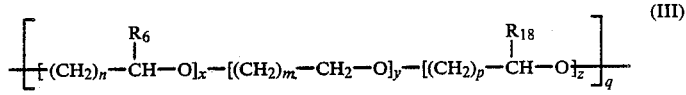

(III)

wherein n=b+1; m=d+1; p=f+1; n, m and p each independently preferably 1–3, more preferably 1–2, most preferably 1; and at least one of $R_6$ and $R_{18}$, but preferably both, is an aliphatic, aromatic, or heterocyclic radical, preferably alkyl of up to 6 carbon atoms; alkyl of up to 6 carbon atoms substituted by alkoxy of up to 6 carbon atoms or fluoro; phenyl which is unsubstituted or substituted by fluoro, alkoxy of up to 6 carbon atoms or alkyl of up to 6 carbon atoms; benzyl wherein the phenyl ring thereof is unsubstituted or substituted by fluoro, alkoxy of up to 6 carbon atoms or alkyl of up to 6 carbon atoms; cyclohexyl or oxacycloalkyl of 4 to 5 ring carbon atoms; or by formula IV

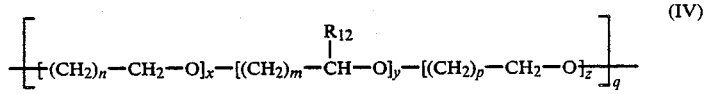

(IV)

wherein n, m, p, x, y, z and q are as defined above for formula III and $R_{12}$ is preferably selected from the same group as $R_6$ in formula III.

In the foregoing it is to be understood that the units of x, y and z may be positioned randomly, in block segments, or alternately.

Another preferred embodiment corresponds to formulae II, III and IV when z is zero.

Desirably, the polymer segments of formula I or II in the completed polymer are substantially devoid of free hydroxyl groups in the interior of the polymer as such groups tend to reduce oxygen permeability.

Free hydroxy groups on the outer surfaces of the formed polymer are acceptable as they increase wettability without drawing water into the polymer matrix. However, it is still preferable to have as few free hydroxy groups in the finished polymer as practical if a contact lens having high oxygen permeability is to be prepared. A suitable means of tying up the free hydroxy groups present would be to interact them with a color group. Typical color groups useful in these embodiments include, but are not limited to the hydroxy-reactive dyes known in the art under the tradename Remazol, manufactured by American Hoechst. Examples of the Remazol dyes which are especially suitable are:

Remazol Brill Blue RW (Color Index Code: Reactive Blue 19);

Remazol Yellow GR (Color Index Code: Reactive Yellow 15);

Remazol Black B (Color Index Code: Reactive Black 5);

Remazol Golden Orange 3GA (Color Index Code: Reactive Orange 78); and

Remazol Turquoise P (Color Index Code: Reactive Blue 21);

all of which have at least one group of the formula

$-SO_2-CH_2CH_2O-SO_3O^{(-)}$ which reacts with the polymer or monomer hydroxy group to yield a

dye$-SO_2-CH_2-CH_2-O-$polymer or

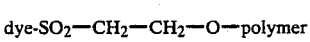
dye-$SO_2-CH_2-CH_2-O-$polymer
or
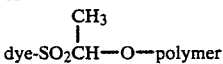
$$\text{dye-SO}_2\text{CH}\underset{|}{\overset{CH_3}{}}-\text{O}-\text{polymer}$$

group, preferably the former. In such a manner, both excess free hydroxy groups are disposed of and colored contact lenses can be realized simultaneously. Another means of disposing of these excessive hydroxy groups is to utilize their presence to form various degrees and types of crosslinking.

In a further embodiment of the invention, the ophthalmic device, preferably a contact lens, is fabricated from a polymer consisting essentially of polymerized units of a reactive monomer of the formula

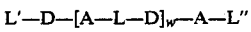
$L'-D-[A-L-D]_w-A-L''$ (V)

wherein each A is independently a divalent moiety of formula I, provided that not all A groups in any one polymer can be homopolymers of polyethylene glycol, preferable all A groups cannot be homopolymers of polyethylene glycol or polypropylene glycol, and provided that the terminal oxygen atom within any one or more A groups may be replaced by

$$-\underset{\underset{\text{N}}{|}}{\overset{R_{19}}{|}}-$$

each L is independently selected from $-BRB'-$; w is 0–8, preferably 0–4, most preferably 0, 1 or 2; D is oxygen or $-N(R_{19})-$; each $R_{19}$ is independently selected from H, $C_1$-$C_4$ alkyl, phenyl, preferably H; each B and B' being selected from

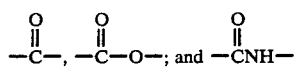
$$-\overset{O}{\underset{||}{C}}-,\ -\overset{O}{\underset{||}{C}}-O-;\ \text{and}\ -\overset{O}{\underset{||}{C}}NH-$$

with the carbonyl group being bound to A or D; each R is a divalent linking group preferably selected from
(i) a divalent aliphatic group of up to 25 carbon atoms which may be interrupted by oxy, carbonyloxy, amino, aminocarbonyl, oxycarbonyl, ureido, oxycarbonylamino, or carbonylamino;
(ii) a divalent 5–7 membered cycloaliphatic having 5–25 carbon atoms;
(iii) a divalent arylene group have 6–25, preferably 7–15 carbon atoms; and
(iv) a divalent aralkyl or alkaryl having 7 to 25 preferably 8–16 carbon atoms; wherein groups (ii) and (iv) can be optionally interrupted by the same groups as in group (i) and wherein the aryl rings in groups (iii) and (iv) may be further substituted with one or more substituents selected from halogen, preferably fluorine or chlorine, $C_1$-$C_4$ alkyl, preferably methyl, and $C_1$-$C_{12}$ perhalo alkyl, especially $C_1$-$C_{12}$ perfluoro alkyl;

L' is selected from H, P'$-$B$-$R$-$B'$-$, and P'$-$R$-$B'$-$ wherein B, R, and B' are as defined above with the carbonyl group of B being bound to P', and P' is H, $NH_2$, OH, or moiety containing a crosslinkable group which may be crosslinked when coreacted with a suitable crosslinking agent or when irradiated by actinic radiation; and L'' is selected from H; L''' as defined hereinafter, $-$B$-$R$-$B'$-$P', and B$-$R$-$P', wherein B, R, B' and P' are as defined above except that the carbonyl of B' instead of B is bound to P'; and L''' is a terminal monovalent aliphatic, aromatic, or cycloaliphatic group of up to 14 carbon atoms.

When P' is a vinyl containing group, for example

$$HC=C-\underset{R_b\ R_a}{|\ \ |}$$

with $R_a$ and $R_b$ as defined below, then the monomer of formula V can be crosslinked in the presence or absence of up to about 10% of other vinylic comonomers, provided that such comonomers are substantially free of hydroxy groups in the final product.

The vinylic comonomer is frequently utilized to increase the hydrophilicity of the final product without substantially altering the other properties mentioned above. Typically, when the vinylic comonomer is a polyethylene glycol of the formula

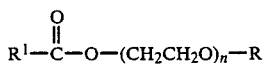
$$R^1-\overset{O}{\underset{||}{C}}-O-(CH_2CH_2O)_n-R$$

or pyrrolidone of the formula

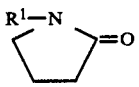

with n being 1-25, R being H or CH$_3$ and R$^1$ being CH$_2$=CH—, CH$_2$=CH—, CH$_2$—C(CH$_3$)— or other UV curable moiety, the resultant polymer is more hydrophillic than previously, but the Dk is essentially the same as when the comonomer is absent.

Usually, when present, the vinylic comonomer is used in an amount of about 2% to about 10% by weight of the resultant polymer. Advantageously, no more than 5% of vinylic comonomer is used when the compound of formula V has a molecular weight in excess of 8000. Generally, when the compound of formula V has a molecular weight of under about 4000, up to 10% by weight of vinylic comonomer can be used. When the compound of formula V has a molecular weight between 4,000 and 8,000, the maximum amount of vinylic comonomer is between 5% and 10% by weight.

When P′ does not have a vinylic group, but takes part in crosslinking, P′ contains an active hydrogen. Preferably P′ terminates in a OH, NHR$_c$ (R$_c$ being H or lower alkyl), a leaving group bound directly to the B or B′ carbonyl, a conventional acyl leaving group when not so bound, SCN— or OCN—. Crosslinking is then typically carried out by condensation or addition with a Bi or polyfunctional coreactive monomer. For example, when P′ is OH, then the coreactive monomer functional group can be —NHR$_c$, —COOH, OCN, SCN, etc.; when P′ is NHR$_c$, the reactive comonomer functional group can be a conventional acyl, or acyl bound to a conventional leaving group; and when P′ has OCN— or SCN—, then the reactive comonomer functional group can be OH. Similarly, the other coreactive functional groups mentioned in terms of either P′ or the coreactive monomer can be interchanged. Those mentioned as part of P′ being on the coreactive monomer and those mentioned as part of the coreactive monomer being part of P′.

Suitable vinylic monomers and coreactive monomers for condensation are set forth below. However, the list is not exhaustive and those of ordinary skill will appreciate the modifications, additions, and alternatives which may also be employed.

When either or both L′ and L″ are H, or terminate in P′ with P′ being H, at least one additional crosslinkable moiety must be present as one of, or a substituent on one of, the groups R$_1$–R$_{18}$. Such crosslinkable groups may also be present as a substituent on or in place of one or more of R$_1$–R$_{18}$ even when both L′ and L″ have crosslinkable groups therein. However, the degree of crosslinking in the finished crosslinked polymer should not exceed 10%, preferably not greater than 5%, more preferably be in the range of 1–4%, most preferably in the range of 2–3%.

In a preferred embodiment, A is the divalent moiety according to formula II, most preferably according to formula III or formula IV.

Especially preferred are polymers of the monomer according to formula V in which L′ and/or L″ is

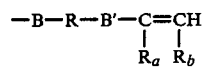

wherein R$_a$ and R$_b$ are each independently H or CH$_3$, but not simultaneously CH$_3$.

A valuable sub-embodiment of the invention relates to ophthalmic devices, preferably contact lenses, of polymers consisting essentially of polymerized units of the formula

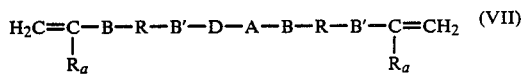

wherein R$_a$, B, R, B′ and A are as defined above, each Ra being independent of the other. Particularly preferred are polymers of the monomers of formula VI and VII wherein R is a divalent arylene group of 6 to 14 carbon atoms, or is a divalent C$_2$–C$_6$ alkylene-oxycarbonyl-C$_6$–C$_{10}$-arylene group; D is —O—; and B and B′ are each —NHCO— wherein the nitrogens thereof are directly bonded to R.

A very highly preferred embodiment are those polymers from monomers of formula V and VII wherein A is of the formula

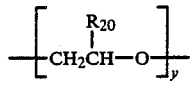

where R$_{20}$ is alkyl of 1 to 4 carbon atoms, most preferably methyl, and y is from about 6 to about 200, preferably from about 25 to about 100, and most preferably from about 50 to about 75.

Also highly preferred are those polymers of monomers of formula V and VII wherein A is of the formula

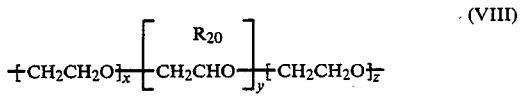

wherein x is between about 2 to about 20 and y is about 8 to about 100, and z about 4 to about 80. Another valuable embodiment requires the value of y to be at least about twice that of x and R$_{20}$ to be alkyl of 1 to 4 carbon atoms, preferably methyl.

The above reactive vinylic monomers are characteristically polymerized under conventional polymerization conditions. In those vinylic monomers containing but one vinyl group, a minor amount eg. from about 0.01 to about 5 weight percent, based on the monomer of formula V, of a conventional crosslinking agent, may be employed. Suitable crosslinking agents include diolefinic monomers such as:

Allyl acrylate and methacrylate; alkylene glycol and polyalkylene glycol di-acrylates and -methacrylates, such as ethyleneglycol dimethacrylate, diethylene glycol dimethacrylate, and propylene glycol dimethacrylate; trimethylol propane triacrylate; pentaerythritol tetracrylate, divinylbenzene; divinyl ether; divinyl sulfone;

bisphenol A diacrylate or methacrylate; methylene bisacrylamide; diallyl phthalate; triallyl melamine and hexamethylene di-acrylate and - methacrylate. Also, such minor amounts of a crosslinking agent may be employed, if desired, in the polymerization of the divinyl monomer of formula V and VII.

When the monomers of formula V have free hydroxy, isocyanato, carboxylic acid, or amine groups, suitable crosslinking agents contain di or poly functional co-reactive groups to form addition or condensation reactions linking 2 or more chains.

If desired, the monomer reaction mixture may contain a catalytic amount of a conventional catalyst, preferably a free radical catalyst. Of particular interest are conventional peroxide and azo catalysts, such as hydrogen peroxide, benzoyl peroxide, tert-butyl peroctoate, benzoyl perodixe or azobis(isobutyrylnitrile).

The polymerization can generally be carried out at temperatures between about 20° to about 150° C., for a period between about 1 to about 24 hours. It is understood that the time and temperature in such a reaction are inversely related. Thus, temperatures employed in the upper end of the temperature range will generally provide reaction times near the lower end of the time range. Preferably, the polymerization is conducted in the presence of actinic radiation, such as UV light.

Depending upon the nature of the polymer mixture, it may be desirable for the polymers obtained from such polymerizations to be post cured, e.g. at a somewhat elevated temperature such as between about 60° C. to about 150° C.

For the preparation of contact lenses, the polymer mixture may be cast directly in the shape of the lens, or the polymerization may be carried out in a mold having a shape convenient for further processing, such as in the shape of small cylinders or "buttons", which can then be machined.

In yet a further subembodiment of the invention, the ophthalmic device, preferably a contact lens, is fabricated from a polymer consisting essentially of an addition product of $$E-Y_1-D-(A-L-D)_w-A-Y_1-E \quad (IX)$$

and $$(E^1)_t-G \quad (X)$$

wherein A, L, D and w are as defined above;

t is an integer of 2 to 4;

G is an aliphatic, aromatic, araliphatic, carbocyclic or heterocyclic residue having a valency corresponding to the value of t and containing up to about 24 carbon atoms, or where t is 2, may also represent a divalent group of the formula $$-Y_1-D-(A-L-D)_w-A-Y_1;$$

$Y_1$ is a divalent aliphatic group of up to 14 carbon atoms which may be interrupted by oxy, carbonyloxy, amino, aminocarbonyl, oxycarbonyl, ureido, oxycarbonylamino or carbonyl; a divalent aliphatic hydrocarbyl - carbonyl or - aminocarbonyl group of up to 14 carbon atoms and wherein the carbonyl group thereof is covalently bonded to the adjacent oxygen or $NR_{19}$ moiety; a divalent 5 to 7 -membered cycloaliphatic group of from 5 to 14 carbon atoms; a divalent arylene group of 6 to 14 carbon atoms; a divalent aralkyl or alkaryl group of 7 to 14 carbon atoms; a divalent 5 to 7-membered cycloaliphatic - carbonyl or -aminocarbonyl group of from 6 to 15 carbon atoms, wherein the carbonyl groups thereof is covalently bonded to the adjacent oxygen or $NR_{19}$ moiety; or a divalent arylene -, aralkyl - or alkaryl - carbonyl or -aminocarbonyl group wherein the arylene group is of 6 to 14 carbon atoms, the aralkyl or alkaryl group is of 7 to 14 carbon atoms, and the carbonyl group is covalently bonded to the adjacent oxygen or $NR_{19}$ moiety; or $Y_1$ is a direct bond where E is hydrogen;

E is hydrogen, hydroxy or amino when $E^1$ is isocyanato or isothiocyanato; and E is isocyanato or isothiocyanato when $E^1$ is hydroxy or amino.

Advantageously, in order to insure adequate crosslinking, in one subembodiment there is employed at least a minor amount of those compounds wherein t is 3, for example at about 0.2% by weight based upon the amount of compound of formula VI employed. Generally, a stoichiometrically equivalent amount of the compounds of IX and X are combined; however a slight excess of di- or polyisocyanate or isothiocyanate may be employed to insure sufficient crosslinking to maintain dimensional stability in the product. As a further alternative, additional conventional crosslinking agents may be employed to insure sufficient crosslinking such that the product maintains dimensional stability. Thus, in addition to the compounds of formula IX and X, there may also be added to the reaction mixture a minor amount, eg. up to about 5 weight percent, of a conventional di-isocyanate or tri-isocyanate such a toluene di-isocyanate, isophorone di-isocyanate, 4,4'-methylenebis(phenyl isocyanate), methylenebis(cyclohexyl isocyanate), melamine tri-isocyanate, and the like. Alternatively where as stoichiometric excess of isocyanate is employed in the reaction of IX and X, a minor amount, e.g. up to about 5 weight percent, of a di- or polyfunctional amine or hydroxylated crosslinking agent may be employed. Suitable such crosslinking agents include, for example ethylene glycol, glycerin, diethylene glycol, ethylene diamine, ethanolamine, triethanolamine, diethanolamine and the like.

The addition reaction between the compounds of formula IX and formula X and any additional crosslinker can be conducted under conditions known, per se. Thus, the compounds may be simply admixed, in the presence of an inert diluent if necessary or desired, at a reaction temperature between about 0° C. and about 100° C., preferably between about 20° C. and 80° C., optionally in the presence of a condensation catalyst, such as triethyl amine or di-n-butyltin diacetate.

In the preparation of ophthalmic devices, such as contact lenses, the reaction mixture may be cast directly in the shape of the lens, or the polymerization may be carried out in a mold having a shape convenient for further processing, such as the shape of a small cylinder or "button", which can then be machined.

The compounds of the formula V, VII, IX and X are either known or can be prepared by methods which are known, per se.

For example, the vinylic monomers of formula V can be prepared by reacting either (a) a mono-ol of the formula $$HO-(A-L-D)_w-A-L''' \quad (XI)$$

where $L'''$ is a terminal monovalent aliphatic, aromatic or cycloaliphatic group of up to 14 carbon atoms, or (b) a diol of the formula $$HO-(A-L-D)_w-A-H \quad (XII)$$

wherein A, L, D and w are as defined above, with a stoichiometric amount of a vinylic compound of the formula

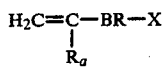  (XIII)

wherein X is a isocyanato group; an activated carboxy group, such as an anhydride, an acid halide, or a carboxy ester; or is a leaving group, such as a halide, sulfato, or the like, at temperatures between about 0° C. to about 100° C., in the presence or absence of a conventional additional catalyst, and in the optional presence of an inert diluent, and recovering the product of formula V. Where X is a leaving group, such as a halide, the product of formula XII may be in the form of its alkoxide, such as alkali metal alkoxide, salt.

Alternatively, one may prepare products of formula V wherein B and B' are —NHCO— and D is —O— by reacting a diisocyanate, such as an aliphatic, aromatic, cycloaliphatic, or araliphatic diisocyanate with a monool or diol according to formula XI or XII, respectively, and react the corresponding isocyanato terminated product with a hydroxy containing acrylate or methacylate, such as hydroxyethyl-acrylate or -methacrylate, or an allyl amine or methallyl amine or allyl or methallyl alcohol to form the corresponding product of formula V at a temperature between about 0° C. and 100° C., in the presence or absence of an inert diluent, and optionally in the presence of an addition catalyst, such as a tertiary amine, e.g. triethylamine or an organo-tin compound and recovering the product of formula V.

Still further, compounds of formula XII can be reacted with compounds of the formula

  (XIV)

where R and X are as defined above, to form a compound of the formula

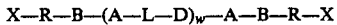  (XV).

Compounds of formula XV are then reacted with an X coreactive moiety which also contains a vinyl group, for example hydroxy ethyl methacrylate to yield a compound of formula V.

The compounds of formula XI and formula XII are known or can easily be prepared by methods known per se.

For example, the compounds of formula XII can be prepared by reacting a diol of the formula HO-A-H with a difunctional reactive group containing compound having the group L wherein the reactive groups are isocyanate, activated carboxy, such as an anhydride, an acid halide or a carboxy ester, or is a leaving groups, such as halide, sulfato or the like. Where the molar ratio of diol to the difunctional reactive group containing compound is about 2 to 1, the value of w in the resulting adduct of formula XII is about 1; where about 3 moles of diol are reacted with about 2 moles of the difunctional group containing compound, the resulting average value of w in the adduct of formula XII is characteristically about 2, and so on. The aforementioned reaction to obtain those compounds of formula XII where w is 1 or greater, can be conducted at a reaction temperature between about −10° C. to about 100° C. depending on the relative reactivities of the species involved, in the presence or absence of an inert diluent and in the optional presence of an addition catalyst, if desired or appropriate.

Suitable polyols and amino polyethers of the formula HD—A—H wherein A represents the divalent moiety of formula I are generally known materials or can be prepared by methods known, per se.

Thus the polyols of the formula HO—A—H are generally prepared by the addition reaction of xq moles of an epoxide of the formula

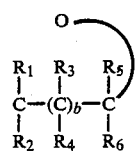  (XVI)

where $R_1$–$R_6$, b, x, and q are as defined above, with yq moles of an epoxide of the formula

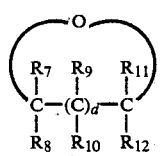  (XVII)

where $R_7$ $R_{12}$, d, y and q are as defined above, and zq moles of an epoxide of the formula

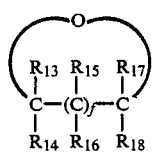  (XVIII)

wherein $R_{13}$–$R_{18}$, f, z, and q are as defined above optionally in the presence of a conventional alkylation catalyst, at atmospheric to elevated pressures of up to about 30 atomspheres gauge, at temperatures between 0° C. to about 130° C., optionally in the presence of an inert diluent. If desired, one may add to the reaction mixture, prior to the reaction of the epoxides, an aliphatic, aromatic or cycloaliphatic alcohol, acid or amine having up to 14 carbon atoms to prepare he corresponding mono-ols terminating in the group D.

The reaction between the epoxides, when mixtures of different epoxides are employed to obtain the polyol of the formula HO—A—H, can be conducted by admixing the epoxides to obtain random copolymers or terpolymers, etc., or the addition can be conducted sequentially to form block copolymers having terminal hydroxy groups. Suitable catalysts include alkaline earth oxides, alkaline earth carbonates, alkyl zinc compounds, aluminum alkoxides, hydrates of ferric chloride, bromide and acetate, and gamma radiation. The reaction may also by initiated by the presence of a glycol, such as ethylene glycol or propylene glycol or by a polyol of higher functionality such as sucrose, or by an amine, such as ethylene diamine, toluenediamine, and so forth. Generally the length of time of the reaction will depend in part on the alkylene oxide employed, but can generally be from less than one to several score hours. Thus, ethylene oxide generally is about three times as active as propylene oxide, which in turn reacts more rapidly than 1,2-butylene oxide. The preparation of polyoxitanes and polyetetrahydrofurans are generally initiated via ring opening oxonium formation using trialkyloxonium salts, carboxonium salts, acylium salts and the like.

Suitable diols of the formula HO—A—H include those prepared from epoxides such as:

1,2-propylene oxide; 1,2-butylene oxide; 1,2-epoxydecane; 1,2-epoxydodecane; 1,2-epoxyoctane; 2,3-epoxynorbornane; 1,2-epoxy-3-ethoxppropane; 1,2-epoxy-3-phenoxypropane; 2,3-epoxypropyl 4-methoxyphenyl ether; tetrahydrofuran; 1,2-epoxy-3-cyclohexyloxypropane; oxetane; 1,2-epoxy-5-hexene; 1,2-epoxyethylbenzene; 1,2-epoxy-1 methoxy-2-methylpropane; perfluorohexylethoxypropylene oxide; benzyloxypropylene oxide; and the like. Also, the aforementioned epoxides may be employed as mixtures thereof. Further, certain cyclic ethers of formula XVI, XVII and XVIII where b or d or f, respectively is 3 and the carbocyclic portion of the ring is substituted are resistant to polymerization alone, but copolymerize quite readily with more reactive cyclic ethers. Suitable co-monomers include, for example, 2-methyl-tetrahydrofuran and 3-methyl-tetrahydrofuran. Also, while ethylene oxide may be employed as a co-monomer, ethylene oxide polymers, in the absence of more hydrophobic units, is characteristically too hydrophilic and too excessively absorbs aqueous fluid to be of use in accordance with the instant invention. However, ethylene oxide/propylene oxide copolymeric diols wherein there is greater than 60% propylene oxide, on a mole basis, is sufficiently hydrophobic so as to be substantially non-swellable in aqueous media, and yet sufficiently hydrophilic so as to exhibit a contact angle with water of less than 60°; preferably less than 40°, more preferably less than 25°, more preferably less than 15°, most preferably less than 10°.

In general, the maximum amount of ethoxy units in the polymer backbone of the instant polymeric ophthalmic devices will depend upon the amount of water absorbed by such polymer under use conditions. The polymers for use according to the instant invention characteristically do not absorb more than about 10% by weight water based upon the total weight of polymer, preferably not more than about 7% by weight water, and most preferably not more than about 5% by weight water. The absorption amount of water is generally or conveniently measured at about 20° C. using distilled water or, if desired, an isotonic solution.

Many polymer diols of the formula HO—A—H are commercially available. Thus, suitable diol products include poloxamers having the general formula

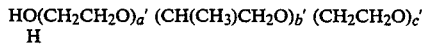

wherein b′ has a value between about 16 and 70 and the sum of a′ and c′ is between about 4 to about 100. Examples of such poloxamers, and their average values of a′, b′ and c′, include poloxamer 101 (a′ is 2, b′ is 16, c′ is 2); polyoxamer 105 (a′ is 11, b′ is 16, c′ is 11); poloxamer 108 (a′ is 46, b′ is 16, c′ is 46); poloxamer 122 (a′ is 5, b′ is 21, c′ is 5); poloxamer 124 (a′ is 11, b′ is 21, c′ is 11); poloxamer 181 (a′ is 3, b′ is 30, c′ is 3); poloxamer 182 (a′ is 8, b′ is 30, c′ is 8); poloxamer 183 (a′ is 10, b′ is 30, c′ is 10); poloxamer 185 (a′ is 19, b′ is 30, c′ is 19); poloxamer 212 (a′ is 8, b′ is 35, c′ is 8); poloxamer 231 (a′ is 6, b′ is 39, c′ is 6); poloxamer 282 (a′ is 10, b′ is 47, c′ is 10); poloxamer 331 (a′ is 7, b′ is 54, c′ is 7); poloxamer 401 (a′ is 6, b′ is 67, c′ is 6).

Such poloxamers are available, e.g. from BASF Wyandotte under their Pluronic ® brand name.

Polypropylene ether glycols include commercially available products having a molecular weight range between about 400 to about 4,000. Also commercially available are polytetramethylene ether glycols of moderately low molecular weight, generally between about 1,000 and 2,000, and polymers of 1,2 butylene oxide, i.e. polybutyl ether glycol.

As stated above, the polymers for use in the instant invention are those which exhibit a receding contact angle at 20° C. of less than 60°, preferably less than 40°, more preferably less than 25°, more preferably less than 15° and most preferably less than 10°. The measurement of such contact angle is conveniently performed using a modified "Wilhelmy Plate" technique, as described, for example, for J. D. Androde, et al. *Surface and Interfacial Aspects of Biomedical Polymers*, Vol. 1, *Surface Chemistry and Physics*, Plenum Press, 1985, wherein a specimen sample in the form of a plate of known dimensions is immersed into the wetting solution, pure water, at a slow controlled rate, e.g. at 2-20 mm per minute. Poly(hydroxyethylmethacrylate) generally has, under these conditions, a receding contact angle of 39°-43°.

As mentioned above, the instant polymers for use in the present invention possess a high degree of oxygen permeability. The oxygen permeability, $Dk(\times 10^{-10})$, is measured using a modification of ASTM standard D3985-81 in that (a) there is used 21% oxygen, i.e. air, instead of 99-100% oxygen, (b) the surface area of sample employed is 0.50 square meters versus 100 square meters and the humidity is controlled to be at 95-100% relative humidity instead of 0% relative humidity. The unit of Dk is (cm.mm/s) (mLO$_2$/ml.mmHg).

Typically, conventional fully swollen polyhydroxyethyl methacrylate lenses which are sparingly crosslinked possess a $Dk(\times 10^{-10})$ (cm.mm/s) (mlO$_2$/ml.mmHg) value of about 5-7.

The oxygen permeability of the instant polymers for use as an ophthalmic device, such as a contact lens, advantageously possess a $Dk(\times 10^{-10})$ value generally greater than 7, preferably greater than about 15, more preferably greater than about 20 and most preferably greater than about 40.

The following examples are for illustrative purposes and are not to be construed as limiting the invention. All parts are by weight unless otherwise specified.

All of the following Examples have procedures common to each. These common procedures are as follows:

1. All glassware is dried in an oven which is at 150° C. for at least 5-6 hours.

2. When assembled the reaction system must stay under a constant nitrogen environment.

3. All of the isocyanates used should be freshly distilled.

4. All of the polyglycol material should contain no more than 0.005% water. For these Examples all of the diols were stripped of water using a Pope wipe film still at 65° C. and less than 2 mm mercury.

5. After the reaction glassware is assembled and under a Nitrogen atmosphere the set up is flame dried for 20 minutes to ensure that all of the moisture is absent from the system.

6. All of the methylene chloride used in these reactions is distilled into molecular seives thru a 20 mm column packed with glass helices.

EXAMPLE 1

2.105 moles of 2,4-toluene diisocyanate is introduced into a carefully dried reaction vessel and 9% by weight of the total prepolymer being prepared of methylene chloride is added thereto. 1.053 mole of polypropyleneglycol (PPG) is added to a dried dropping funnel and 51% by weight of the total prepolymer being prepared of methylene chloride is added thereto as well as 0.0029 moles of stannous octoate (catalyst). The PPG mixture is added to the diisocyanate mixture over a period of 2–4 hours. The reaction is monitored by the disappearance of the OH peak in IR spectroscopy at about 3500 cm$^{-1}$. At this time, 2.105 moles hydroxyethyl methacrylate is added to the mixture and the reactions monitored by IR spectroscopy by the elimination of the NCO peak at 2270 cm$^{-1}$. 0.88% Durocur ® 1173 2-hydroxy-2-methyl-1-phenyl-propan-1-one is then added and the methylene chloride stripped from the prepolymer at 25° C. under reduced pressure. The material thus produced is cured in a UV oven at approximately 3–5 millwatts. The crosslinked polymer is then extracted in isopropanol for 5–6 hours to yield the desired contact lens material.

EXAMPLES 2–10

The procedure of Example 1 is followed using the amounts specified in the following table. When the isocyanate/diol ratio is 3:2, the isocyanate is preferably added to the diol instead of the diol being added to the isocyanate.

| EXAMPLE | DIOL | ISO/DIOL | DIOL MOL | ISO MOL | HEMA MOL | CAT MOL |
|---|---|---|---|---|---|---|
| 1 | PPG 475 | 2:1 | 1.053 | 2.105 | 2.105 | .0029 |
| 2 | PPG 725 | 2:1 | .690 | 1.379 | 1.379 | .0015 |
| 3 | PPG 1025 | 2:1 | .488 | .976 | .976 | .0011 |
| 4 | PPG 2000 | 2:1 | .250 | .500 | .500 | .0006 |
| 5 | PPG 3000 | 2:1 | .167 | .333 | .333 | .0004 |
| 6 | PPG 4000 | 2:1 | .125 | .250 | .250 | .0003 |
| 7 | PPG 1000 | 3:2 | .500 | .750 | .500 | .0011 |
| 8 | PPG 2000 | 3:2 | .250 | .375 | .250 | .0006 |
| 9 | PPG 3000 | 3:2 | .167 | .250 | .167 | .0004 |
| 10 | PPG 4000 | 3:2 | .125 | .187 | .125 | .0003 |

The above is at able consisting of molar ratios of several diol/diisocyanate reactions. All of these numbers are based on an initial amount of diol of 500 g. These reactions are all capped with HEMA.

In the Examples which follow all amounts of reactants are in grams, the equivalent number of moles being in parentheses, and Dk values are $\times 10^{-10}$. Contact angles are given in degrees.

EXAMPLE 11

To a three necked round bottom flask equipped with an air cooled condenser, dropping funnel, Claisen adapter, nitrogen inlet and outlet with the outlet fitted with a dessicant tube, is added 152.6 g (1.053 mol) of TDI and 200 g of methylene chloride. The mixture is agitated with a large magnetic stirring bar for approximately 20 minutes. To a dropping funnel is added 250 g of PPG 475, 323 g of methylene chloride, and 1.09 g (0.0027 mol) stannous octoate. The reactants are added to the flask slowly over a four to five hour period. After four more hours the completion of the reaction is checked by IR spectroscopy by denoting the disappearance of the hydroxyl peak at 3500 cm. When this peak has dissipated 136.99 g of HEMA is added to the round bottom flask via a dropping funnel over a twenty minute period. The completion of the reaction can again be followed by IR by observing the disappearance of the NCO absorption at 2270 cm. After completion of the reaction the prepolymer solution is transferred to a single neck flask which is then connected to a rotary evaporator so that the methylene chloride can be removed. This stripping stage generally takes one and a half hours with the last thirty minutes done at 30° C. The prepolymer now has 0.6% Durocur added to it and is cured at 3–5 milliwatts for thirty to ninety minutes. The film produced from this prepolymer has a Dk of 3.2 and contact angle better than HEMA.

EXAMPLES 12–16

The procedure of Example 11 is followed except that the reactants and amounts specified below were used and the resultant Dk's obtained.

|  | TDI | First CH$_2$Cl$_2$ | Glycol type | amount | Second CH$_2$Cl$_2$ | Sn octoate | Hema | Duracur | Dk | Contact angle relative to pHema |
|---|---|---|---|---|---|---|---|---|---|---|
| 12 | 120.12 (.6897) | 200 | PPG 725-250 | (.3448) | 356 | 1.09(.0027) | 189.76(.6897) | .6% | 4.1 | better |
| 13 | 87.1(.5) | 700 | PPG 1000-250 | (.25) | 305 | .77(.0019) | 65.07(.5) | .6% | 9.6 | better |
| 14 | 43.5(.25) | 500 | PPG 2000-250 | (.125) | 316 | .77(.0019) | 32.54(.25) | .6% | 16.8 | better |
| 15 | 29.0(.1667) | 200 | PPG 3000-250 | (.0833) | 351 | .45(.0011) | 21.69(.1667) | .6% | 28.0 | comparable |
| 16 | 21.8(.125) | 200 | PPG 4000-250 | (.0625) | 316 | .40(.0010) | 16.27(.125) | .6% | 39.3 | better |

EXAMPLE 17

To a three necked round bottom flask fitted with an air cooled condenser, dropping funnel, Claisen adaptor, mechanical stirring bar, nitrogen inlet and outlet with the outlet equipped with a dessicant tube is added 250 g (0.5263 mol) of PPG 475, 500 g of methylene chloride, and 1.00 g (0.0025 mol) of stannous octoate. The reactants are well stirred for forty-five minutes. To a dropping funnel is added 102.75 g (0.7895 mol) of TDI and 237 g of methylene chloride. The diisocyanate mixture is added over a four to five hour period dropwise to the diol; checking the reaction mixture occasionally for heat generated in the course of the reaction. If the methylene chloride starts to reflux simply stop adding additional increments of diisocyanate and allow the reaction mixture to come to ambient temperature with the aide of a water bath. After three to four hours the completion of the reaction can be followed by IR spectroscopy by the disappearance of the hydroxyl adsorption at 3500 cm$^{-1}$. After this adsorption has dissipated 68.49 g (0.5263 mol) of HEMA is added via a dropping funnel over a twenty to thirty minute period. The completion of the reaction can again be followed by IR by observing the disappearance of the NCO adsorption at 2270 cm$^{-1}$. After completion of the reaction the prepolymer solution is transferred to a single neck flask which is then connected to a rotary evaporator so that the methylene chloride can be removed. The stripping is done at approximately 5 mm Mercury and ambient temperature for the first hour then at 30° C. for the last thirty minutes. The prepolymer now has 0.6% Durocur added to it and is cured at 3-5 milliwatts for thirty to ninety minutes. The film produced from this prepolymer has a Dk of 3.9 and a contact angle better than that of HEMA.

be cooled by the use of an ice bath. After three to four hours the completion of the reaction can be followed by IR spectroscopy by the disappearance of the hydroxyl adsorption at 3500 cm$^{-1}$. The completion of the reaction can also be followed by IR by observing the disappearance of the NCO adsorption at 2270 cm$^{-1}$. After completion of the reaction the prepolymer solution is transferred to a single neck flask which is then connected to a rotary evaporator so that the methylene chloride can be removed. The stripping is done at approximately 5 mm Mercury and ambient temperature for the first hour then at 30° C. for the last thirty minutes. The prepolymer now has 0.6% Durocur added to it and is cured at 3-5 milliwatts for thirty to ninety minutes. The film produced from this prepolymer has a Dk of 10.00 and a receding contact angle equivalent to that of HEMA.

EXAMPLES 24-28

These Examples were prepared following the procedures of Example 23, except that the reactants and amounts below were used and the Dk's and contact angles reported were obtained.

| | Glycol | | First | | Styrene | Second | | | Contact angle relative to |
|---|---|---|---|---|---|---|---|---|---|
| | type | amount | $CH_2Cl_2$ | Sn octoate | Isocyanate | $CH_2Cl_2$ | Duracur | Dk | pHema |
| 24 | PPG 725-250 | (.3448) | 350 | .45(.0011) | 99.99(.6896) | 150 | .6% | 14.00 | equivalent |
| 25 | PPG 1000-250 | (.25) | 350 | .45(.0011) | 72.50(.5) | 150 | .6% | 17.50 | equivalent |
| 26 | PPG 2000-250 | (.125) | 350 | .45(.0011) | 36.25(.25) | 150 | .6% | 33.5 | equivalent |
| 27 | PPG 3000-250 | (.0833) | 350 | .45(.0011) | 24.16(.1667) | 150 | .6% | 44.30 | equivalent |
| 28 | PPG 4000-250 | (.0625) | 350 | .45(.0011) | 118.13(.125) | 150 | .6% | 67.20 | equivalent |

EXAMPLES 18-22

These Examples were prepared following the procedure of Example 17 except that the reactants and amounts indicated below were used and the Dk and contact angle reported were obtained.

| | Glycol | | First | | | Second | | | | Contact angle relative to |
|---|---|---|---|---|---|---|---|---|---|---|
| | type | amount | $CH_2Cl_2$ | Sn octoate | TDI | $CH_2Cl_2$ | Hema | Duracur | Dk | pHema |
| 18 | PPG 725-250 | (.3448) | 400 | .8(.002) | 90.08(.5172) | 213 | 44.87(.3448) | .6% | 6.6 | better |
| 19 | PPG 1000-250 | (.25) | 300 | .6(.0015) | 65.31(.375) | 147 | 32.5(.25) | .6% | 11.40 | better |
| 20 | PPG 2000-250 | (.125) | 362 | .6(.0015) | 32.66(.1875) | 100 | 16.3(.125) | .6% | 25.70 | better |
| 21 | PPG 3000-250 | (.0833) | 350 | .6(.0015) | 21.77(.125) | 100 | 10.84(.0833) | .6% | 28.50 | better |
| 22 | PPG 4000-250 | (.0625) | 350 | .6(.0015) | 16.33(.0938) | 150 | 8.14(.0625) | .6% | 47.50 | equivalent |

EXAMPLE 23

To a three necked round bottom flask fitted with an air cooled condenser, dropping funnel, Claisen adaptor, mechanical stirring bar, nitrogen inlet and outlet with the outlet equipped with a dessciant tube is added 250 g (0.5263 mol) of PPG 475, 350 g of methylene chloride, and 0.60 g (0.0015 mol) of stannous octoate. The reactants are well stirred for forty-five minutes. To a dropping funnel is added 152.63 g (1.0526 mol) of styrene isocyanate and 150 g of methylene chloride. The isocyanate mixture is added over a six to eight hour period dropwise to the diol; checking the reaction mixture occasionally for heat generated in the course of the reaction. It is imperative that the temperature of the reaction not exceed 35° C. or generally color will develop in the reaction mixture. If the temperature starts to increase the contents of the reaction mixture should

EXAMPLE 29

To a three necked round bottom flask containing an air cooled condenser, Clasien adaptor, magnetic stirring bar, nitrogen inlet and outlet with the outlet fitted with a desicant tube, and dropping funnel is added 21.67 g (0.1250 mol) of toluene diisocyanate (TDI) and 200 g of methylene chloride. This mixture is well stirred before addition of additional reagents. To a dropping funnel is added 250 g (0.0625 mol) of PPG 4000, 323 g of methylene chloride, and 0.66 g (0.0020 mol) of stannous octoate. The PPG 4000 and stannous octoate solution is added to the TDI solution over a four to five hour period. After four to five additional hours the completion of the reaction can be judged by IR Spectroscopy by denoting the disappearance of the hydroxyl functionality at 3500 cm$^{-1}$. The IR spectra will also have two important additional adsorptions at around 2270 cm$^{-1}$ and 1750 cm$^{-1}$ which correspond to the NCO carbonyl and carbamate carbonyl respectively. When the reaction has been determined to be complete, 18.75 g (0.0313 mol) of PEG 600 and 100 g of methylene chloride is added slowly over a two hour period via a dropping funnel. The completion of the reaction can again be followed by IR Spectroscopy by observing the disappearance of the hydroxyl functionality at 3500 cm$^{-1}$. After the PEG 600 has completely reacted, 8.14 g (0.0625 mol) of HEMA is added to the flask via a dropping funnel over a twenty to thirty minute period. The completion of the reaction is monitored by the disappearance of NCO peak at 2270 cm$^{-1}$. After the completion of the reaction the prepolymer solution is transferred to a single neck flask which is then connected to a rotary evaporator so that the methylene chloride can be removed. This stripping stage generally takes one and a half hours with the last thirty minutes done at 30° C. The prepolymer now has 0.6% Durocur added to it and is cured at 3-5 milliwatts for thirty to ninety minutes. The film produced form this prepolymer has a Dk of 33.

EXAMPLES 30-36

These Examples were prepared following the procedure of Example 29 except that the second glycol and the amount of methylene chloride utilized therewith are set forth below along with the resulting Dk's and contact angles.

|    | Second Glycol | |  |  |
|----|---------------|---|---|---|
|    | type | amount | CH$_2$Cl$_2$ | Dk |
| 30 | PEG 1000 | 31.25(.0313) | 100 | 45 |
| 31 | Poloxamer 105 | 59.47(.0313) | 100 | 45 |
| 32 | Poloxamer 108 | 156.5(.0313) | 100 | 31 |
| 33 | Poloxamer 124 | 68.86(.0313) | 100 | 42 |
| 34 | Poloxamer 182 | 78.25(.0313) | 175 | 39.7 |
| 35 | Poloxamer 183 | 82.95(.0313) | 175 | 44.7 |
| 36 | Poloxamer 185 | 106.42(.0313) | 175 | 46.2 |

EXAMPLE 37

Example 28 is repeated, except that after the reaction is completed, but before the methylene chloride is removed, 10% by weight of N-vinyl pyrrolidone is added. The methylene chloride is removed and 0.6% Durocur is added. Curing takes place as in Example 28. The resultant polymer has a water content of 9.8%.

What is claimed is:

1. An optically clear, wettable, flexible, hydrolytically stable, biologically inert, substantially siloxane-free, substantially non-swellable in ocular tear fluid, and oxygen permeable polymer fabricated from a crosslinkable polymer having units of the formula I

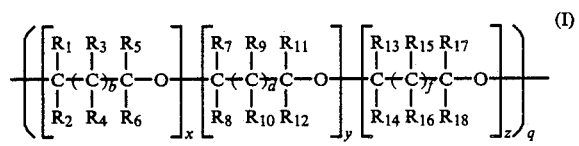

wherein each b, d and f is independently 0-4; q is a number from 1 to 1000; each x, y and z is independently 0 to a number such that (x+y+z) times q=4 to 1000; each of $R_1$-$R_{18}$ are selected from the group consisting of hydrogen, an aliphatic, aromatic or alicyclic containing radical, each optionally interrupted by a heteroatom provided no carbon atom in said unit is geminally bound to oxygen atoms; or 2 adjacent groups $R_1$-$R_{18}$, together with the atoms to which they are attached can form a 5-8 membered ring, and $R_1$-$R_{18}$ may be further selected from or have a substituent selected from crosslinkable moieties provided that no carbon atoms bearing geminal oxygen atoms results and the terminal oxygen within a unit of formula I may be replaced by —NR$_{19}$— wherein $R_{19}$ is hydrogen, $C_{1-4}$alkyl, or phenyl, provided that when b, d and f are all 0, at lest one of $R_1$, $R_2$, $R_5$-$R_8$, $R_{11}$-$R_{14}$, $R_{17}$ and $R_{18}$ in at least a portion of the units of formula I is other than hydrogen and such $R_1$, $R_2$, $R_5$-$R_8$, $R_{11}$-$R_{14}$, $R_{17}$ and $R_{18}$ individually or in the aggregate is sufficiently hydrophobic such that the resulting polymer is substantially non-swellable in water; said ophthalmic device having a receding contact angle with distilled water of less than 60° when measured at 20° C.; contains less than about 10% water; and having an oxygen permeability, Dk ($\times 10^{-10}$[cm.mm/sec] [mlO$_2$/ml.mmHg]), greater than about 7.

2. An optically clear, wettable, flexible, hydrolytically stable, biologically inert, substantially siloxane free, substantially non-swellable in ocular tear fluid, and oxygen permeable polymer according to claim 21 fabricated from a crosslinked polymer of a monomer of the formula $$L'-D-[A-L-D-]_wA-L'' \qquad (II)$$

wherein
w is 0-8;
each D is independently —O— or —N(R$_{19}$)—;
each $R_{19}$ is independently H, $C_1$-$C_4$ alkyl, or phenyl;
each L is independently —BRB'—;
each B and B' is independently

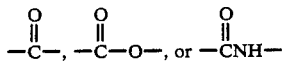

wherein the carbonyl group is bound to said D or said A;
each R is a divalent linking group selected from $C_1$-$C_{25}$ aliphatic $C_5$-$C_7$ membered cycloaliphatic having 5-25 carbon atoms; aralkyl or alkaryl having 7-25 carbon atoms wherein the aliphatic and alkyl groups can be optionally interrrupted by

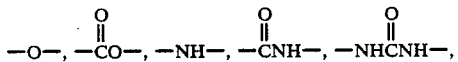

and the aryl and arylene groups are unsubstituted or further substituted with a substituent selected from halogen, $C_1$-$C_4$ alkyl and $C_1$-$C_{12}$ perhaloalkyl;
L' is selected from H, P'—R—B'— and P'—B—R—B'— wherein B, R and B' are as defined above and P' is H or a moiety capable of being bound to the carbonyl of

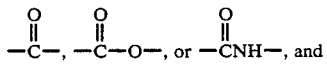

containing a group capable of undergoing crosslinking when coreacted with a crosslinking agent or when irradiated by actinic radiation;

L″ is selected from H, a terminal monovalent aliphatic, aromatic or cycloaliphatic group of up to 14 carbon atoms, —B—R—P′ and —BRB′P′ wherein B, R, B′ and P′ are as defined above;

and each A is a unit of the formula I according to claim 21.

* * * * *